United States Patent [19]

Moroni et al.

[11] 4,070,300
[45] Jan. 24, 1978

[54] POURABLE SOLID FILTER MATERIAL, PARTICULARLY FOR THE REMOVAL OF UNPLEASANT ODORS FROM THE AIR, AND A PROCESS FOR ITS MANUFACTURE

[75] Inventors: Rolf Moroni, Bornheim-Hersel; Heinz Kalbow, Konigswinter-Stieldorf, both of Germany

[73] Assignee: COLLO GmbH, Bornheim-Hersel, Germany

[21] Appl. No.: 475,287

[22] Filed: May 31, 1974

[30] Foreign Application Priority Data

| June 9, 1973 | Germany | 2329645 |
| May 9, 1974 | Germany | 2422574 |

[51] Int. Cl.$^2$ .............................................. C01K 3/00
[52] U.S. Cl. ................................... 252/190; 252/184; 252/186; 252/192; 252/193; 252/259.5; 423/230; 423/237; 423/239; 423/244; 428/407
[58] Field of Search ................... 252/194, 259.5, 184, 252/193, 410, 190, 192; 55/387; 423/237, 239, 244; 427/220; 428/407

[56] References Cited

U.S. PATENT DOCUMENTS

| 1,346,349 | 7/1920 | Tate | 252/194 X |
| 1,559,980 | 11/1925 | Perrott et al. | 423/237 |
| 1,586,327 | 5/1926 | Perrott et al. | 423/237 |
| 1,614,753 | 1/1927 | Moyer | 252/194 |
| 1,864,988 | 6/1932 | Downs | 252/259.5 X |
| 2,033,698 | 3/1936 | Finn | 252/193 X |
| 2,424,992 | 8/1947 | Lee | 252/259.5 X |
| 2,795,560 | 6/1957 | Williams | 252/855 |
| 2,957,828 | 10/1960 | Mansfield | 252/194 |
| 2,967,154 | 1/1961 | Beerman | 252/194 |
| 3,391,988 | 7/1968 | Friess et al. | 423/244 |
| 3,400,079 | 9/1968 | Clifford et al. | 252/184 |
| 3,511,596 | 5/1970 | Adler et al. | 252/193 |
| 3,635,821 | 1/1972 | Treadwell | 427/220 X |
| 3,679,369 | 7/1972 | Hashimoto et al. | 423/239 X |

FOREIGN PATENT DOCUMENTS

| 221 of | 1884 | United Kingdom | 252/259.5 |

Primary Examiner—Herbert B. Guynn
Attorney, Agent, or Firm—Meyer, Tilberry & Body

[57] ABSTRACT

A pourable solid filter material for the removal of foreign gases, particularly unpleasant odors, from the air comprises a granular composition. The granular composition is a mixture of at least one acid or basic chemosorptive substance which reacts chemically with the foreign gas, and a substance which stores moisture. A binder which binds the chemosorptive substance into the form of granules is preferably also used as the moisture storing substance. The granules may consist of spherical particles between 0.5 to 5 mm. in diameter. Suitable acid chemosorpents include organic carboxylic acids, amidosulphonic acid, p-toluene sulphonic acid, boric acid, sodium, potassium and ammonium hydrogen sulphates and phthalic andydride. Preferred basic chemosorbents include sodium and potassium carbonates, oxides or hydroxides of calcium and barium, sodium metasilicate, lithium carbonate, hydroxides of sodium or potassium, cement, and potash, double, and soda water glass. Suitable for the water soluble (or capable of swelling) binder or adhesive are cellulose derivatives, e.g., methyl-, carboxymethyl-, hydroxyethyl- and ethyl-cellulose, cellulose derivatives of the Tylose or Culminal grades, polyvinyl alcohol, collagen, alginates, pectins and starch.

2 Claims, 3 Drawing Figures

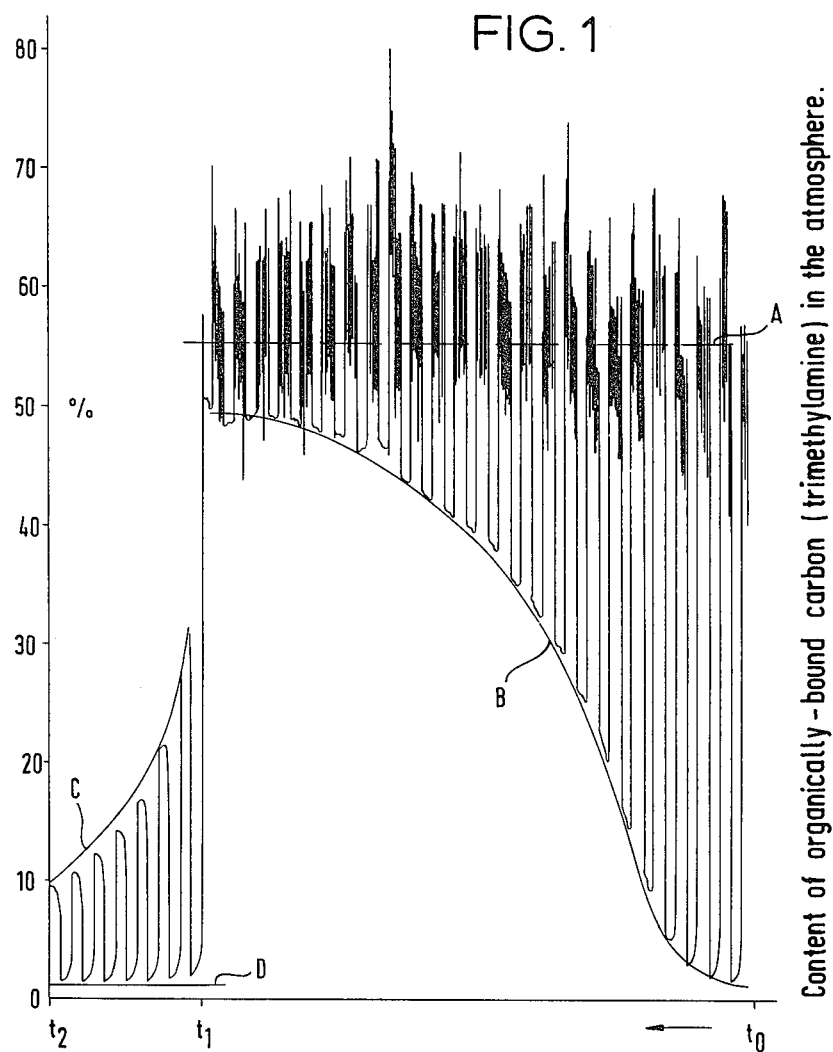

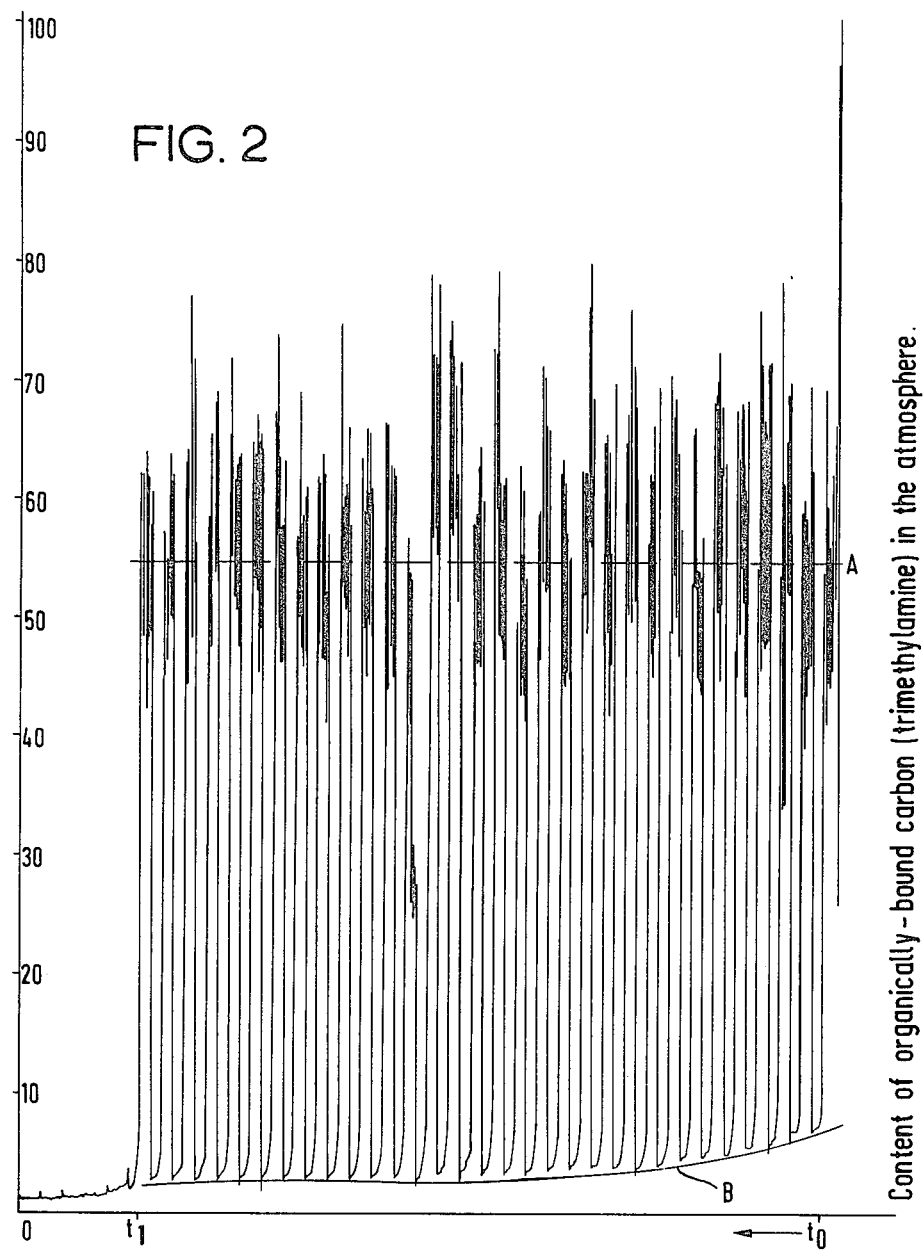

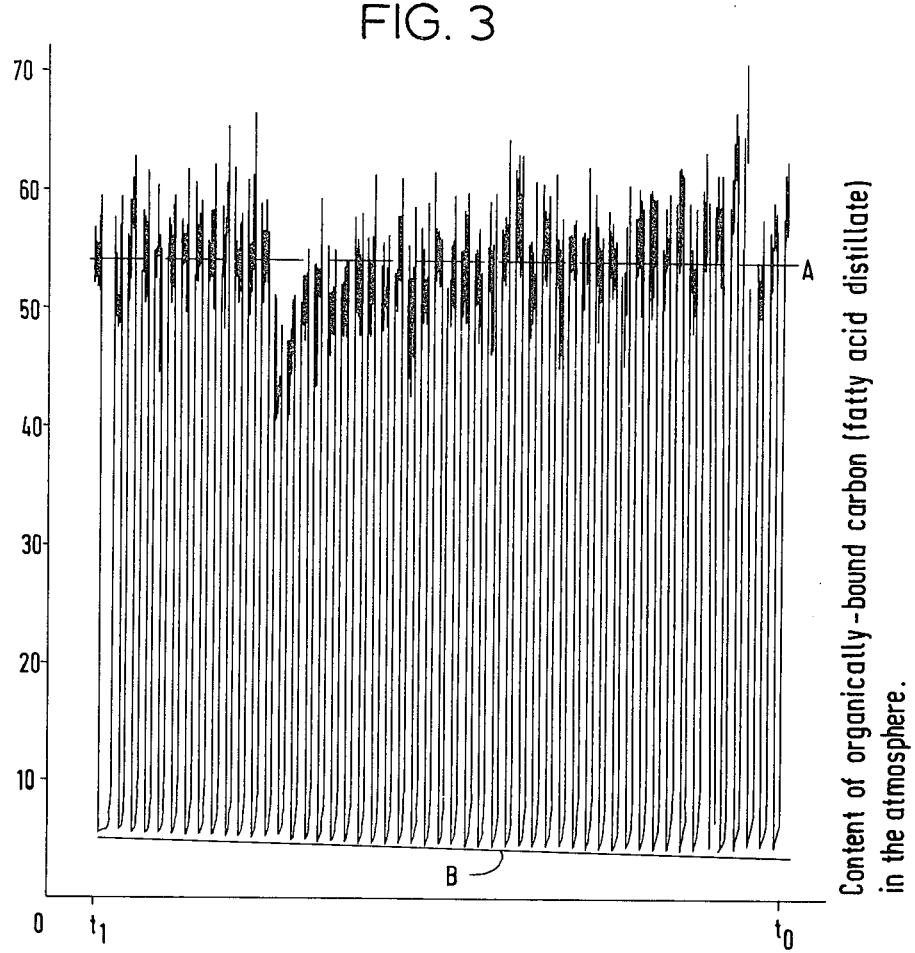

POURABLE SOLID FILTER MATERIAL, PARTICULARLY FOR THE REMOVAL OF UNPLEASANT ODORS FROM THE AIR, AND A PROCESS FOR ITS MANUFACTURE

The invention relates to a pourable solid filter material for the removal of foreign gases, particularly unpleasant odours, from the air, consisting of a granular form of at least one sorptive filter component. The invention further relates to a process for the manufacture of such a pourable solid filter material and to suitable pourable solid combined filters.

The invention is particularly concerned with the removal of unpleasant kitchen odours from the air and generally with the deodorisation of the air of living rooms and recreation rooms and the like and of the air which leaves manufacturing areas and stables and the like.

In spite of their wide use, the adsorption filters which are known for the purposes mentioned, such as, above all, active charcoal filters, are not free from disadvantages. Since the absorption capacity of the active charcoal depends on the temperature, the substances adsorbed can be set free again at temperatures above 40° C. In particular, low molecular substances, such as, for example, $NH_3$ or lower amines, are hardly taken up by the absorptive filter materials and are readily desorbed again.

For the destruction of unpleasant odours and other harmful materials in a gaseous form by an oxidative means, catalyst filters are also known, in which a finely porous, hydrophylic and open-cell plastic foam, in the cell structure of which the catalysts are incorporated, is used as the supporting material for a Redox system having a catalytic action. Oxides of polyvalent metals, such as manganes, iron, copper, cobalt, nickel, silver and the like, in certain combinations are used above all as oxidation catalysts. These substances are added to the cellular plastic premix in a very finely divided form so that, after foaming has taken place, they are firmly bound in the cell structure of the cellular plastic. It has already been proposed to develop such filter materials as pourable solid filters. In this case the cellular plastic material which has been treated with the incorporated oxidation catalysts is processed to give a finely particulate cellular plastic flock material or granules of cellular plastic.

The foreign gases to be removed from the air are in practice mostly mixtures of chemically different gases, the concentration of which can be subject to considerable variations. In order to achieve for favourable filtering results, it is therefore, necessary to select the materials having a filtering action qualitatively and quantitatively as much as possible with regard to the particular field of use and application of the filter. On the other hand, the reactivity of the filtering material must be so constituted that, as far as possible, all the odorous substances and harmful gases carried along by the air are largely removed during the passage through the filter. It will be understood that in this regard high filtering throughputs and residence times in the filter which are as long as possible are to be aimed for. Filter material should also be active even at relatively low temperatures which are within the range of the room temperatures.

The invention is based above all on the problem of providing a filter material which fulfils the abovementioned requirements as far as possible. In particular, the invention is aimed at a highly active and economical filter material which can be adjusted to the particular purpose in a relatively simple manner and which displays, at relatively long residence times in the filter, a high activity even when the air to be filtered contains mixtures of chemically different foreign gases. The invention further relates to a suitable process for the manufacture of the filter material and to various multi-component pourable solid filters.

The filter material according to the invention is characterised in that the granular composition consists of a mixture of at least one acid or basic chemosorptive substance which reacts chemically with the foreign gas, and a substance which stores moisture. A binder which binds the chemosorptive substance in the form of granules is preferably used as the substance to store moisture.

In the case of the filter material according to the invention, the acid and/or alkaline gases carried along by the air are thus chemically neutralised in passing through the filter bed. In order that the chemical reaction can take place as an ionic reaction in a phase of dissociation, it is essential that the filter material contains, in addition to the substances with a chemosorptive action, substances which regulate moisture or hydrophylic substances which absorb the moisture of the air and, if appropriate, the water of reaction produced in the ionic reaction, and thus keep the moisture content of the filter material at a level adequate for its activity, without, however, thereby putting the mechanical properties of the pourable solid material at risk. Exhaustive experiments have shown that a pourable solid filter material, the granules of which consist of a mixture of chemosorptive substance and a water-soluble binder which sets the latter in the form of granules, has a high selective filtering activity towards certain foreign gases carried along by the air while at the same time having granules with a sufficiently high mechanical abrasion resistance of compression strength so that, even at a relatively high atmospheric moisture content and mechanical stress, serious abrasion or disintegration of the granules cannot occur. It will be understood that the nature of the particular chemosorptive substances used is selected to accord with the nature of the particular foreign gas to be removed. If the air to be purified contains acid and alkaline foreing gases side by side, it is possible to provide acid and basic chemosorptive substances selected appropriately to these gases. In this case, the granular pourable solid mass therefore has a predetermined proportion of granules composed of the acid chemosorptive substance as well as a further proportion of granules composed of a substance with an alkaline reaction. The granular constitutents of the various components can be adjusted in a simple manner to the constituents of the various foreign gases carried along by the air.

According to a preferred embodiment, the granular mass is present in the form of bead granules, that is to say roughly spherical granules. A suitable diameter for the spherical-shaped particles is about 0.5 to 8 mm, preferably 1 to 5 mm. Such a spherical shape of granule is not only advantageous in respect of an advantageous ratio between the mass and the surface of an individual granule and in respect of the mechanical strength of the latter and the bulk density of the pourable solid mass; it also has the advantage that, in a mixture of acid and alkaline granules, there is essentially only point contact between granules, so that no appreciable self-neutralisation of the acid and basic components of the pourable solid can take place in use.

The substances used for the chemosorptive substances are, naturally, such substances as react chemically, under the conditions in which the filter is used, with the acid or alkaline gases which are carried along by the air and which are to be destroyed. The following above all are suitable acid chemosorbents, which can be used for neutralising alkaline foreing gases: organic monocarboxylic acids or polycaboxylic acids, for example phthalic acid, citric acid, benzoic acid and tartaric acid, and also amidosulphonic acid, p-toluenesulphonic acid, boric acid, sodium hydrogen sulphate, potassium hydrogen sulphate, ammonium hydrogen sulphate and phthalic anhydride.

The following basic chemosorbents in particular, can be used for the chemical reaction with acid foreign gases: sodium carbonate, potassium carbonate, calcium oxide, calcium hydroxide, barium oxide, barium hydroxide, sodium matasilicate, lithium carbonate, sodium hydroxide, potassium hydroxide, cement, potash waterglass, double waterglass, soda waterglass and the like.

Practically all binders or adhesives which are water-soluble or capable of swelling can be used as binders for the chemosorbents. The following binders, in particular, are suitable: cellulose derivatives, particularly methylcellulose, carboxymethylcellulose, hydroxyethylcellulose and ethylcellulose, above all cellulose derivatives of the Tylose or Culminal grades, polyvinyl alcohol, for example Mowiol or Polyviol grades, collagen, alginates, pectins and starch.

It is advisable to add to the granular mass, in addition to the chemosorptive substances and the binder, at least one further substance which stores liquid or is capable of swelling, and this need not necessarily have the properties of a binder. Practically all substances which are hydrophylic or capable of swelling are suitable for this purpose, such as above all swellable clay (Tissolit), for example bentonite or montmorillonite, expanded clay, tuff, pumice, brick dust, rigid foam, for example phenolic sresin foam or polyurethane foam, and silicic acid derivatives (for example Aerosil or Cabosil), such as, for example, silica gel, waterglass and kieselguhr.

In this case the individual granules therefore consist of a mixture of a chemosorptive substance, a hydrophylic binder and a substance which stores water or is capable of swelling, which mixture is processed to give granules.

According to a further characteristic of the invention it is possible to add further additives with specific properties to the granular mass. Such additives consist, for example, of oxidising agents, such as, for example, potassium permanganate, sodium persulphate, barium peroxide, sodium perborate, sodium percarbonate, potassium dichromate, chromium trioxide, potassium perchlorate, potassium nitrate and potassium persulphate, which destroy, in an oxidative manner, odorous substances or the like which are carried along by the air. Flame-retarding substances can also be incorporated into the granules in accordance with the invention. Substances suitable for this purpose are above all those substances which eliminate nitrogen or ammonia on heating. For example, diammonium hydrogen phosphate is suitable. It is advisable to process the flame-retarding substance together with the other substances to form granules in such a manner thar the flame-retarding substance forms the inner core of a granule, surrounded by the chemosorptive substance.

According to a further embodiment, the granules forming the pourable solid filter have a skeleton core of a substance which stores moisture and this core is provided with a reactive coating of a chemosorptive substance. The skeleton core can consist, for example, of an individual granule, for example of pumice, cellular plastic and the like, which forms the real supporting material for the chemosorptive substance, the adhesion of the letter to the skeleton being appropriately improved by means of a water-soluble binder. The granules thus comprise a skeleton core of a substance which stores moisture, and a coating thereon comprised of a binder and a chemosorptive substance, such chemosorptive substance preferably being present in an amount in excess of the substance which stores moisture.

Various processes such as are in themselves known in other fields of the art are suitable for the manufacture of the granular composition. The chemosorptive substance is preferably processed in a pulverulent form together with a substance which stores liquid or is water-soluble, with the addition of water, to form granules; this can be carried out with the aid of a conventional disc granulator. In this process the chemosorptive substance and the binder are sprayed with water or with an aqueous solution of the chemosorptive substance during the granulation so that granules are formed from the substances mentioned on the rotating disc of the granulator. In the course thereof it is possible to add substances of the kind mentioned which have no binder properties and which store moisture singly or as combinations to the mixture of substances before or during granulation. It is also possible to add further additives, such as, for example, an oxidising agent and/or flame-retarding agents, to the mixture before granulation.

The granular pourable solid mass can also be manufactured according to the invention by multi-stage granulation. In this case, for example, an inner core is prepared on a disc granulator and is subsequently provided with a reactive coating of a chemosorptive substance in a second granulation stage, which can also be carried out on the disc granulator. This procedure is advantageous, for example, if a flame-retarding substance is added to the granular material. In this case granules composed of the flame-retarding substance are obtained in the first granulation stage, which are subsequently provided with the coating of the chemosorptive substance in a further granulation stage the small multi-stage procedure can also be provided according to the invention if, in the first granulation stage, an inner core is prepared from a substance which absorbs liquid, which core is then coated with the chemosorptive substance in the second stage.

Some examples of the granular masses, according to the invention, which are used as pourable solid filter masses, are given in the following text:

I. ACID GRANULES

Example 1:

800 g of sodium hydrogen sulphate (in the form of powder) are mixed with 200 g of a cellulose derivative of the type Tylose H 10,000 of Farbwerke Höchst and worked up, with the addition of water in a manner which is in itself known, on a disc graanulator to give granules with a particle size which is preferably between 2 and 5 mm. Spherical granules are obtained consisting predominantly of sodium hydrogen sulphate, which has an acid reaction and which is set with Tylose as binder. It is also possible to spray the mixture of pulverulent sodium hydrogen sulphate and Tylose with a salt solution of sodium hydrogen sulphate during the granulation.

Example 2

In the process described above acid granules are prepared from 750 g of amidosulphonic acid and 250 g of pectin or alginate.

Example 3

Granules are prepared in the manner described from the following materials:
- 500 g of p-toluenesulphonic acid,
- 400 g of kieselguhr and
- 100 g of polyvinyl alcohol, grade: Mowiol 66-10 of Farbwerke Höchst.

Example 4

Granules are prepared from the following materials with the aid of a disc granulator:
- 700 g of ammonium hydrogen sulphate,
- 50 g of p-toluenesulphonic acid and
- 250 g of a cellulose derivative, grade: Tylose H 10,000 of Farbwerke Höchst.

Example 5

Granules are prepared from the following materials with the aid of the disc granulator:
- 500 g of citric acid,
- 400 g of bentonite and
- 100 g of starch powder (cold-soluble).

Example 6

Granules are prepared from the following materials with the addition of water by means of a disc granulator:
- 600 g of sodium hydrogen sulphate,
- 200 g of kieselguhr and
- 200 g of cellulose ether.

II. BASIC GRANULES

Basic granules can be prepared from the following compositions of matter in the manner described above with the aid of a disc granulator:

Example 7

- 1,000 g of calcium hydroxide and
- 660 g of sodium waterglass, diluted 1 : 1 with water.

Example 8

- 700 g of sodium carbonate,
- 200 g of sodium persulphate and
- 100 g of a cellulose derivative, grade: Tylose H 10,000.

Example 9

- 800 g of calcium oxide,
- 100 g of potassium dichromate and
- 100 g of methylcellulose.

Example 10

- 200 g of sodium hydroxide and
- 800 g of brick dust.

Example 11

- 500 g of calcium hydroxide and
- 500 g of Portland cement.

III. Two-stage granulation of acid or basic granules

Example 12

A flame-retarding agent, for example pulverulent diammonium hydrogen phosphate, is granulated, with the addition of water, on a disc granulator to give a particle size of, for example, 2 to 4 mm. These cores are then provided, on the same granulator, with a coating of a chemosorptive substance of the kind mentioned, for example of amidosulphonic acid. Two-layer granules with a particle size of about 3 to 7 mm are formed, which, on heating, give off gaseous ammonia which stifles flames. Protection of the filter material from fire is thereby achieved.

IV. ACID OR BASIC GRANULES WITH AN INNER SKELETON CORE

Example 13

A substance capable of swelling or storing water, for example pumice, is broken up to give a particle size of, for example, 2 to 3 mm. The granules are then coated in a disc granulator with a chemosorptive substance, for example sodium carbonate, with the optional use of a water-soluble binder, the particle size of the finished granules being about 4 to 6 mm. Granules with a reactive coating and a liquid-absorbent core are formed in this way.

It is also possible to use a finely particulate cellular plastic material composed of flexible foam or rigid foam, with a particle size preferably below 10 mm, as the core material or supporting material for the chemosorptive substance. The finely particulate cellular plastic material is coated or impregnated with a chemosorptive substance.

Example 14

1,000 g of an acid salt, for example sodium hydrogen sulphate, are dissolved in 500 g of water, whereupon 36 g of a flocked, open-cell, hydrophylic foam (preferably polyurethane foam) are introduced into the solution. The foam particles impregnated with the salt solution are then warmed until the outer coating has dried out.

It is possible to impregnate one part of the finely particulate cellular plastic material with acid, chemosorptive substances and to impregnate another part of the cellular plasic material with basic, chemosorptive substances. The foam particles impregnated with the various chemosorptive substances can be used in an intimate mixture as a pourable solid filter. Since the greatest part by far of the chemosorbents are in the interior of the open pores of the cellular plastic, no appreciable mutual neutralisation of the basic and acid chemosorbents can occur in such pourable solid filters.

As already explained, in the case of kitchen odours or the odours produced in living rooms, assembly rooms or manufacturing areas or stables and carcass processing plants, the odours are generally mixed odours consisting partly of acid compounds, partly of basic compounds or partly of chemically neutral compounds. The most advantageous pourable solid filters for each specific purpose, from a qualitative and quantitative point of view, can be assembled in each case by selecting the granular filter materials according to the invention and combining them with one another and, if appropriate, with further components having a filtering action. Further suitable components with a filtering activity are above all active characoal and/or oxidation catalysts (Redox systems). Hydrophilic, open-cell foam particles, preferably of polyurethane foam, but, if appropriate, also of other foams, such, for example, viscose foam or the like, on which the oxidation catalysts are taken up, are appropriately used as supports for oxidation catalysts. The catalytic substances are suitably caused to foam into the hydrophilic foam material, which after foaming and curing, is comminuted to finely particulate granules or flock material, preferably below 10 mm. The pore size of the cellular plastic is appropriately about 0.3 to 4 mm, preferably 0.5 to 2 mm. Oxides or hydroxides of polyvalent metals, such as above all manganese, iron, cobalt, copper, nickel or silver, individually or combined, are used as the oxidation catalysts and are added to the foam premix in as finely divided a form as possible, so that, after foaming, they are firmly bound in the cell structure of the cellular plastic.

The following are examples of mixed filters, which can be used and can be assembled from the various pourable solid components:

Example 15

A mixture of
42% by volume of active charcoal,
25% by volume of cellular plastic treated with oxidation catalyst and
33% by volume of granules according to Example 13
can be used, for example, as a pourable solid filter for purifying the air which leaves in the distillation of a fatty acid. Degradation of the organically-bound carbon by 91% at a single passage through the filter is achieved with a layer thickness of 50 mm and a speed of 0.25 m/seconds for the outgoing air. The diagram according to FIG. 3 shows a section from the experimental record.

Example 16

Multi-component pourable solid filter, for use particularly in kitchen vapour extractor hoods:
A mixture of the following components is prepared:
20% by volume of cellular plastic charged with oxidation catalyst,
30% by volume of active characoal,
25% by volume of granules according to Example 7 and
25% by volume of granules according to Example 1.
The layer thickness of the pourable solid mixture was 50 mm; the speed of air through the pourable solid filter was 0.3 m/seconds. Experiments have shown that, in using such a pourable solid filter, 95% of the acetic acid and 97% of the trimethylamine are removed in a single passage of air mixed with acetic acid or trimethylamine. Acetic acid can be regarded here as representative of acid constitutents of food (acid cooking odours) and trimethylamine can be regarded as characteristic of fish odours. The abovementioned composition is particularly suitable for use in filtering air containing concentrations of cooking or frying vapours.

Example 17

For purifying the air which leaves foundries:
In the foundries operating on the Cold-Box process, outgoing air containing major amounts of amines is produced, because the mouldings are treated with a mixture of $CO_2$ and lower amines in order to harden them. A mixture of
70% by volume of granules according to Example 2 and
30% by volume of active charcoal
is employed in a layer thickness of 100 mm. The air speed is 0.4 m/seconds. 50 ppm ($NH_3$) were measured in the untreated air before the filter inlet, while less than 1 ppm ($NH_3$) was measured in the purified air after the filter.

Example 18

Chicken manure drying plants:
Considerable quantities of ammonia and amines are produced, inter alia, in drying chicken manure. A mixture of the following components was used as a pourable solid filter:
25% by volume of active charcoal,
20% by volume of celular plastic charged with oxidation catalyst and
55% by volume of granules according to Example 5.
The layer thickness of the pourable solid filter was 100 mm; the speed of air through the filter bed was 0.64 m/second. A reduction in the $NH_3$ content from 100 ppm to 20 ppm could be determined with a single passage of the outgoing air through the filter.

Example 19

Pourable solid filter for deodorising the air which leaves livestock stables, particularly pigsties:
In addition to carbon dioxide, which is odourless, the main constituents of the stable air are hydrogen sulphide and ammonia, besides alcohols, amides, amines, carbonyl compounds, mercaptans, methane and organic acids. A pourable solid filter with the following mixture can be used advantageously to filter the stable air:
20% by volume of cellular plastic charged with oxidation catalyst,
20% by volume of active charcoal,
40% by volume of granules according to Example 1 and
20% by volume of granules according to Example 9.
The layer thickness of the pourable solid filter was 100 mm; the air speed was 0.28 m/second.

Example 20

Deodorising air in living rooms, assembly rooms and the like:
Human perspiration consists, inter alia, of lactic acid, butyric acid, propionic acid, valeric acid and decomposition products of substances containing protein. A filter material of the following composition is employed very successfully for the removal of such odours and human exhalations:
40% by volume of cellular plastic charged with oxidation catalyst,
20% by volume of active charcoal,
20% by volume of granules according to Example 5 and
20% by volume of granules according to Example 9.

Example 21

Air conditioning equipment and other filtering equipment for the purification of air in rooms are intended not only to remove the exhalations produced in the room, they are also generally used to remove harmful substances which have entered the room from outside. Sulphur dioxide, originating from combustion processes of fossil fuels, is a widely distributed harmful substance in the external air. The filter material specified in Example 20 is advantageously modified in such a way that the absorptive capacity of the filter material for $SO_2$ is increased, namely as follows:

35% by volume of cellular plastic charged with oxidation catalyst,
20% by volume of active charcoal,
15% by volume of granules according to Example 4 and
30% by volume of granules according to Example 9.

It will be understood that this filter material is also effective against other acid constituents of the atmosphere.

As already described above, low molecular substances, such as, for example, $NH_3$ or lower amines, are not very well absorbed or are readily desorbed again by adsorption agents (active charcoal). As extensive test experiments have shown, chemosorptive substances produce considerably better results here, particularly when sharply varying concentrations of crude gas are involved. Since chemosorptive substances are at least partly specific in their filtering action, a certain proportion of adsorptive materials (active charcoal) should be added, if need be, to the pourable solid filter in order to remove, by adsorptive means, harmful substances which cannot be removed chemosorptively. The catalytically active pourable solid component degrades harmful substances by oxidative means. If the oxidation is to stop at intermediate stages, the latter can be bound chemosorptively. The combination of the various pourable solid components therefore leads to an extension of the field of application of both the chemosorptively active component and of the catalytically active component. To this may be added that the chemosorption and the catalytic reaction are favoured by a higher temperature, while the filtering action of purely adsorptive substances falls off as the temperature rises.

The various pourable solid components can be mixed in the predetermined proportions and employed as a mixed bed filter. On the other hand, however, it is also possible to arrange the pourable solid components in successive layers in the air stream it being possible to influence the sequence of chemosorption, adsorption and catalytic reaction.

FIGS. 1 to 3 show the results of some series of tests which were carried out with the aid of a flame ionisation detector. In such a testing apparatus the conductivity of a hydrogen flame is influenced by organically-bound carbon. The current flowing is proportional to the content of organically-bound carbon. Since most odours contain organically-bound carbon, this testing apparatus can be used direct to determine the effectiveness of the filter, by measuring the organically-bound carbon in each case before and after the filter.

In the diagrams the ordinates indicate the content of organically-bound carbon in the air, while the time of measurement is plotted on the abscissae.

The chart diagram according to FIG. 1 shows the filtering action of a commercially available active charcoal for the purposes of purifying air from trimethylamine. It will be seen that, during the duration of measurement, the content of organically-bound carbon in the air upstream of the active charcoal filter was at about 55 divisions of the scale (straight line A). The curve B shows the content of organically-bound carbon in the air downstream of the active charcoal filter. It can be seen that, at the beginning of the measuring procedure (point of time $t_0$), the content of organically-bound carbon in the air downstream of the filter is only about two divisions of the scale. This content increases rapidly, even after a few minutes. At point of time $t_1$, that is to say on switching off the supply of harmful gas or trimethylamine to the air arriving at the filter, the concentration of organic carbon before and after the filter is nearly the same. Thus the active charcoal loses its filtering action even after a relatively short time of use. After switching off the supply of harmful gas at the point of time $t_1$, the active charcoal desorbs the trimethylamine previously absorbed by it, as shown by curve C. The content of organically-bound carbon (trimethylamine) downstream of the active charcoal filter is, according to curve C, 30 to 10 divisions of the scale greater than that upstream of the filter, which, as straight line D shows, is nearly zero.

The diagram represented in FIG. 1 is based on the following additional test conditions:

| | |
|---|---|
| Thickness of filter: | 50 mm |
| Diameter of filter: | 70 mm |
| Charge: | 71 g |
| Temperature: | 20° C |
| Atmospheric humidity, relative: | 72% |
| Air speed: | 0.3 m/second |
| Pressure drop in the filter: | 17 mm water column |
| Measuring apparatus: | FID |
| Scale: | 0 – 1,000 |
| Feed rate: | 120 mm/hour |
| Calibration: | on propane |
| Harmful gas: | trimethylamine |
| Filter material: | active charcoal. |

The chart according to FIG. 2 show the same experiment with the pourable solid filter in accordance with the invention according to Example 1. The fundamentally different behaviour of this filter material will be seen. According to curve B, the content of organically-bound carbon (trimethylamine) in the air after the filter at the beginning of the period of measurement (point of time $t_0$) decreases from a value indicated by eight divisions of the scale to a value of about three divisions of the scale, and in fact decreases at the rate at which water of reaction is formed in the chemical reaction of the trimethylamine. Even after a few minutes the concentration of trimethylamine in the air after the filter is constant at a value of about 3 divisions of the scale. This value is maintained during the whole period of measurement until the supply of trimethylamine is switched off (point of time $t_1$). After switching off the supply of trimethylamine, the content of harmful material in the air before and after the filter is about zero. No desorption takes place.

The diagram represented in FIG. 2 is based on the following test conditions:

| | |
|---|---|
| Thickness of filter: | 50 mm |
| Diameter of filter: | 70 mm |
| Charge: | 194 kg |
| Temperature: | 20° C |
| Atmospheric humidity, relative: | 72% |
| Air speed: | 0.3 m/second |
| Pressure drop in the filter: | 11 mm water column |
| Measuring apparatus: | FID |
| Scale: | 0 – 100 |
| Feed rate: | 120 mm/hour |
| Calibration: | on propane |
| Harmful gas: | trimethylamine. |

FIG. 3 shows a section from the measuring record of a filter mixture according to Example 15. Here a fatty acid distillate was used as the harmful gas. The curve B shows a content of harmful material in the air after the filter for the time of measurement $t_0$ to $t_1$. It can be seen that about 91% of the harmful gas (fatty acid distillate) contained in the air were decomposed by the filter over the whole period of the experiment.

The diagram represented in FIG. 3 is based on the following test conditions:

| | |
|---|---|
| Thickness of filter: | 50 mm |
| Diameter of filter: | 70 mm |
| Temperature: | 18 – 18.5° C |
| Atmospheric humidity, relative: | 85 – 86% |
| Air speed: | 0.25 m/second |
| Pressure drop in the filter: | 6 mm water column |
| Measuring apparatus: | FID |
| Scale: | 0 – 100 |
| Feed rate: | 120 mm/hour |
| Calibration: | on propane |
| Harmful gas: | fatty acid distillate. |

The chemosorptive component can also be bound to a finely particulate cellular plastic material formed by comminuting or flaking a rigid or flexible, hydrophylic, open-cell foam, such as, above all, polyurethane. The cellular plastic material in this case is impregnated and coated with the chemosorptive substance. The use of cellular plastic as a framework or a supporting material for chemosorptive substances offers the possibility of attaching on the cellular plastic exceptionally large quantities of chemosorbents, which amount to up to about 120% by volume of the volume of the cellular plastic. The weight of the chemosorbents taken up by the cellular plastic in the course thereof is about 15 to 30 times that of the weight of the cellular plastic. Since the chemosorptive substances occupy essentially the total cell wall surface of the cellular plastic, a large contact area is available. It is advisable to adjust the particle size of the cellular plastic in such a way that at least the predominant part of the cellular plastic material is below 10 mm. In general, merely a slight trace of moisture, arising from the moisture content of the atmosphere and the residual moisture of the filter material, is sufficient for the chemical reaction with the chemosorptive substances in a moist medium. However, in order to guarantee an adequate moisture in every case or to maintain the moisture content of the filter material at an adequately high level even for lengthy residence times, it is advisable to add to the cellular plastic material, in addition to the chemosorptive substance, at least one material which stores moisture, such as, in particular, a swelling agent, for example bentonite, collagen, carbohydrate, alginates, silica gel, waterglass and the like. The materials mentioned can be mixed with the granules of cellular plastic. Preferably, however, the materials are added to the chemosorptive substance and are applied with the latter to the cell structure of the cellular plastic, so that they are embedded in the chemosorptive substance in a very fine state of distribution and adhere to the cellular plastic material. The proportion of these materials, relative to the proportion of chemosorptive substances, is appropriately about 5 to 30% by weight, preferably 10 to 20% by weight. It is also possible, however, to incorporate the moisture-storing materials mentioned, additionally or exclusively, in the cellular plastic material, so that they are firmly bound in the cell structure thereof. In regard to the maintenance of a sufficient moisture in the filter material, the hydrophilic character of the cellular plastic material is also important.

Some examples of such a filter material are given in the following text:

EXAMPLE 22

A hydrophilic, open-pore foam with an average pore size of preferably 0.8 to 2 mm, for example a polyurethane foam, is comminuted by means of a flaking machine and is then screened on a 10 mm sieve. The portion passing through the sieve therefore has a particle size less than 10 mm, the preponderant proportion of the foam flocks being within the range of 2 to 5 mm.

The foam flock material prepared in this way is then impregnated by means of a saturated solution of sodium carbonate, after which the water is then expelled by heating until a residual moisture of about 10% remains. This treatment can be carried out in a mixer with a rotating mixing device, into which the flock material and the sodium carbonate solution are introduced. After the impregnation of the flock material with the sodium carbonate solution, hot air at a temperature of 150° to 200° C is introduced into the mixer in order to expel the excess water and to dry the flock material until sodium carbonate is present in a firm, adhering layer on the surfaces of the cell walls of the cellular plastic. The finely particular material thus prepared consists to an extent of about 30% by weight of cellular plastic and to the extent of about 60% by weight of sodium carbonate, while the remainder is made up of the residual moisture and, where appropriate, other additives incorporated in the cellular plastic material.

A finely particulate cellular plastic material impregnated with sodium carbonate according to this example can be used advantageously in order to remove from the atmosphere, for example, $SO_2$, $H_2S$ or nitrous gases ($NO_2$). Hydrogen sulphide is contained particularly in the outgoing air of knacker's yards, sewage treatment plants, chicken farms, cellulose industries and the like, while NO or $NO_2$ are found predominantly in the outgoing air of chemical industries.

The layer thickness of the pourable solid filter formed by the abovementioned cellular plastic material is appropriately about 30 to 80 mm, while the air speed through the pourable solid filter bed is preferably adjusted to between about 0.3 and 0.5 m/second.

EXAMPLE 23

Example 22 is modified as follows:
1% by weight of methylcellulose is added to the sodium carbonate solution as an adhesive and a binder, before the cellular plastic material is saturated or impregnated with this solution. As a result, the adhesion of the sodium carbonate on the cell wall framework of the cellular plastic is improved. Furthermore, the methylcellulose improves the water-retaining capacity of the cellular plastic material.

Instead of methylcellulose, another binder which is water-soluble or capable of taking up water, for example carboxymethylcellulose, can be added to the sodium carbonate solution in proportions of, for example, 0.5 to 2% by weight.

EXAMPLE 24

A finely particulate cellular plastic material impregnated with soda, according to Example 22, is mechanically mixed with active charcoal and with a likewise finely particulate, flock-like or granular cellular plastic material which contains catalytic substances of a Redox system incorporated (but no chemosorptive substance). This mixture, which is used as a pourable solid filter after being intimately mixed, then contains, for example:

| | |
|---|---|
| Cellular plastic material impregnated with chemosorptive substance | 50% by weight |
| Active charcoal | 25% by weight |
| Finely particulate cellular plastic material treated with incorported catalytic substances | 25% by weight. |

EXAMPLE 25

A hydrophilic, finely particulate and open-pore cellular plastic material, for example a material according to Examples 22 and 23, is impregnated with a saturated solution of amidosulphonic acid, after which the excess water is driven off until the residual moisture is about 10%. The treatment can be carried out in accordance with Example 22. The cellular plastic material thus obtained is impregnated with amidosulphonic acid, which adheres to the cell wall framework. Here too the proportion by weight of the cellular plastic material (without impregnation) is about 30% by weight and the proportion by weight of the amidosulphonic acid attached to the cellular plastic is about 60% by weight (the remainder is residual moisture and, if appropriate, other additives of the kind mentioned which are contained in the impregnating agent).

A filtering agent of this kind is particularly suitable for the removal of $NH_3$ or amines from the atmosphere. These substances occur, for example, in the outgoing air of pigsties, fish processing plants and chicken farms.

Here too it is advisable to add to the impregnating agent (amidosulphonic acid solution) a binder which is capable of swelling or taking up water, such as, for example, methylcellulose or carboxymethylcellulose, such as is indicated in Example 23.

EXAMPLE 26

As homogeneous a mixture as possible is prepared from the following substances:
- 10% by weight of impregnated cellular plastic material according to Example 25
- 10% by weight of impregnated cellular plastic material according to Example 22
- 60% by weight of finely particulate cellular plastic material (below 10 mm) without impregnation by chemosorbents, but with incorporated catalytic substances of a Redox system.
- 20% by weight of active charcoal.

Such a pourable solid mixture is suitable above all for the removal of kitchen odours and odours in inns, assembly rooms and the like.

EXAMPLE 27

A finely-particulate, hydrophilic and open-pore cellular plastic material (preferably polyurethane foam) is impregnated in the manner described with one of the following chemical oxidising agents:

A peroxy compound, sodium persulphate, barium peroxide, sodium perborate or sodium percarbonate.

Such a filtering material can be used for oxidising foreign gases carried along in the air, particularly for the destruction of protein decomposition products containing sulphur, for example sulphur dioxide and mercaptan.

While an open-pore, hydrophilic, rigid or flexible polyurethane foam is preferably used in the above examples for the preparation of the filtering material, it is also possible, however, to employ other cellular plastic materials, for example viscose foam.

Manganese (hydrated manganese oxide) and iron (iron-II oxide hydrate) and optionally copper (copper-I oxide) additionally are preferably employed as the oxidation catalysts in the examples listed above.

It is possible to add, to the filtering material according to the invention, oil-adsorbing oleophilic materials, such as, for example, melamine resin, in the form of fine granules or in the form of foam flocks, for example in proportions of up to 10% by weight. These materials too can be admixed mechanically to the filter material.

In the case of a mixture composed of granules with acid and basic chemosorptive substances and adsorptive materials (active charcoal), it is possible for the adsorptive materials in the mixture to act as distance spacers in order to reduce, to a statistically small extent, a chemical reaction between the various constituents of the mixture, one with another. It is furthermore desirable that the granules shall be spherical in all cases, in order to keep the surfaces of contact between the particles small. Under certain circumstances a reaction at points can even be regarded as desirable, since adhesion and therefore stabilisation of the filter bed is achieved thereby.

When using oxidation catalysts (Redox system) in combination with chemosorptive substances, it is possible for any harmful gases contained in the atmosphere, which are not converted chemically by the chemosorptive substances, to be oxidised by catalytic means to substances which react chemically with the chemosorptive substances. The same holds when using oxidising agents in combination with chemosorptive substances.

What is claimed is:

1. A pourable solid filter material for the removal of foreign gases, particularly unpleasant odors, from air consisting of granular mass comprised of granules having a substantially spherical shape and a diameter of about 0.5 mm to 8.0 mm characterized in that said granules have:
    a. a skeleton core of a substance which stores moisture selected from a class consisting of: swellable clay, expanded clay, tuff, pumice, brick dust, rigid plastic foam, silica gel and Kieselguhr, and
    b. a coating on said core comprising a mixture of:
        i. a water soluble binder selected from a class consisting of: cellulose derivatives, polyvinyl alcohol, collagen, alginates, pectins and starch, and
        ii. at least one acidic chemosorptive substance which reacts chemically with said foreign gas selected from the class consisting of: organic monocarboxylic acids, organic polycarboxylic acids, amidosulphonic acid, p-toluene sulphonic acid, boric acid, sodium hydrogen sulphate, potassium hydrogen sulphate, ammonium hydrogen sulphate and phthalic anhydride,
    said selected chemosorptive substance being present in a proportion greater than said substance which stores moisture.

2. A pourable solid filter material for th removal of foreign gases, particularly unpleasant odors, from air consisting of granular mass comprised of granules having a substantially spherical shape and a diameter of about 0.5 to 8.0 mm characterized in that said granules have:
- a. a skeleton core of a substance which stores moisture selected from a class consisting of: swellable clay, expanded clay, tuff, pumice, brick dust, rigid plastic foam, silica gel and Kieselguhr, and
- b. a coating on said core comprising a mixture of:
  - i. a water soluble binder selected from a class consisting of: cellulose derivatives, polyvinyl alcohol, collagen, alginates, pectins and starch, and
  - ii. at least one chemosorptive substance which reacts chemically with said foreign gas selected from the class consisting of: acidic chemosorptive substances and basic chemosorptives substances, wherein said acidic chemosorptive substances are selected from a class consisting of: organic monocarboxylic acids, organic polycarboxylic acids, amidosulphonic acid, p-toluenesulphonic acid, boric acid, sodium hydrogen sulphate, potassium hydrogen sulphate, ammonium hydrogen sulphate and phthalic anhydride, and wherein said basic chemosorptive substances are selected from a class consisting of: sodium carbonate, potassium carbonate, calcium oxide, calcium hydroxide, barium oxide, barium hydroxide, sodium metasilicate, lithium carbonate, sodium hydroxide, potassium hydroxide, cement, and waterglass, said selected chemosorptive substance being present in a proportion greater than said substance which stores moisture;

said granular mass is comprised of granules having a coating which includes at least one of said selected acidic chemosorptive substances and further including granules having a coating which includes at least one of said selected basic chemosorptive substances.

* * * * *